United States Patent
Wood

[15] 3,658,360
[45] Apr. 25, 1972

[54] MOTORCYCLE STAND
[72] Inventor: George R. Wood, 528-1/2 E. Fairview, Inglewood, Calif. 90302
[22] Filed: June 22, 1970
[21] Appl. No.: 48,119

[52] U.S. Cl. .................................................. 280/302
[51] Int. Cl. ........................................................ B62h 1/02
[58] Field of Search ............... 280/302, 303, 301, 298, 299, 280/300, 293

[56] References Cited

UNITED STATES PATENTS

| | | | |
|---|---|---|---|
| 2,791,441 | 5/1957 | Phillips | 280/302 |
| 3,039,792 | 6/1962 | Wood et al. | 280/302 |
| 761,516 | 5/1904 | Lloyd et al. | 280/302 |
| 1,654,862 | 1/1928 | Clyne | 280/302 |
| 2,908,510 | 10/1959 | Lossau | 280/303 X |
| 3,362,726 | 1/1968 | Bell | 280/303 |

Primary Examiner—Kenneth A. Betts
Attorney—Smyth, Roston & Pavitt

[57] ABSTRACT

A stand comprising a pair of plates for attachment to the forward part of the frame of a motorcycle, providing a pair of bushings on a transverse axis through which bearings the cross-bar of a U-shaped assembly is passed. At least one of the plates is further arcuately orificed for a predetermined distance to receive a stop member adapted to move about an arc parallel to the cross-bar and to be stopped by the extremities of the arcuate orifice. A spring connected between a projection on at least one plate and one of the arms of the U-shaped member serves to urge the latter into either a locked extended or retracted position.

2 Claims, 5 Drawing Figures

PATENTED APR 25 1972

INVENTOR.
George R. Wood

ATTORNEYS

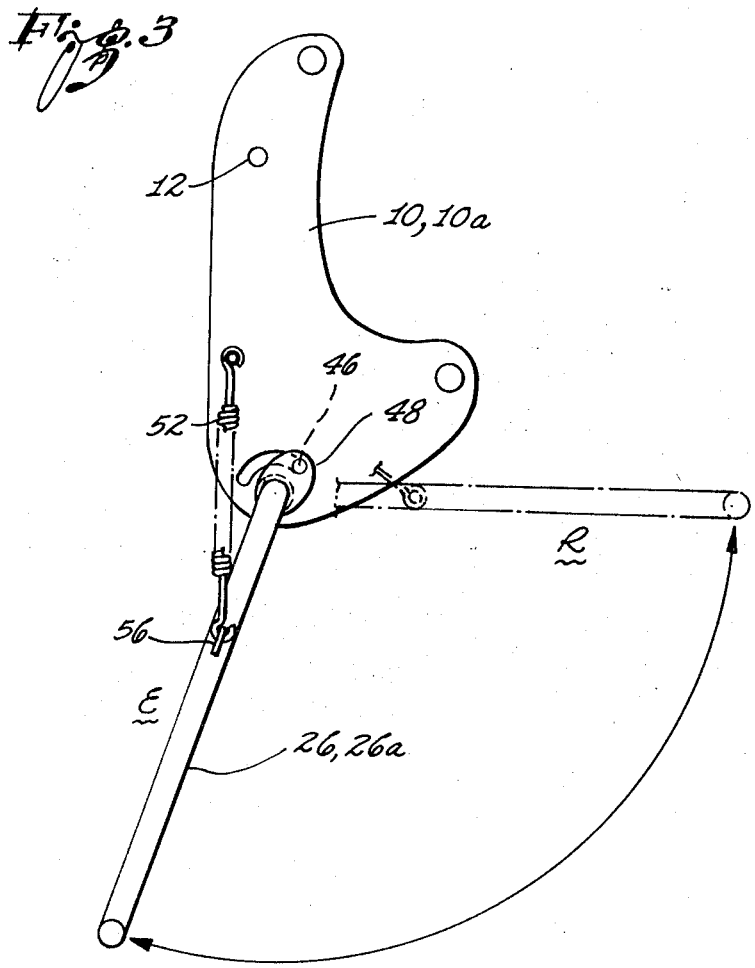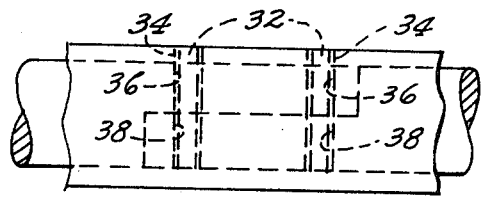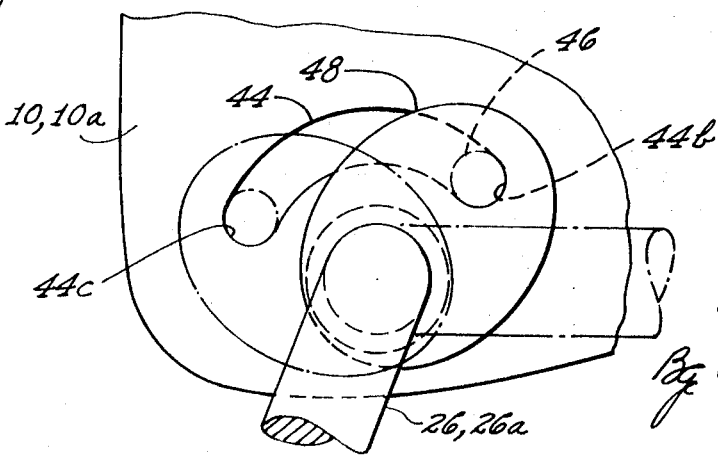

MOTORCYCLE STAND

RELATED PATENT

There are no related applications, but applicant is one of the two joint inventors of the invention in a motorcycle stand described and claimed in U.S. Rat. No. 3,039,792, issued June 19, 1962.

BACKGROUND OF THE INVENTION

1. Field of the Invention

This invention relates to retractable stands for supporting in an upright position above ground level a portion of a heavy vehicle such as a motorcycle.

2. Background of the Invention

In recent years motorcycles have attained great popularity in the United States. They range in size from small motorized bicycles to the large police types. Most motorcycles are equipped with some type of stand, but usually these stands are of the single leg type which requires that the motorcycle be tilted to the side from which the stand leg projects.

Some motorcycles, particularly of the smaller type, however, come equipped with double-legged stands. Usually these are designed to elevate the rear wheel of the motorcycle and not the front wheel. When these double legged stands are so disposed on a large motorcycle, it takes two strong persons to elevate the rear of the motorcycle enough to snap the stand into supporting position. When the operator desires to drop the machine down to ground level, he may find that he needs assistance. In any event, since the powered wheel is elevated, the operator cannot simply ride off the stand.

In 1962 there were patented to the present inventor and another, two related types of two-legged stand which were designed to be attached to the forward as well as rear portions of a motorcycle. This stand is quite effective, but it employs the motorcycle frame itself as one of the two elements of the stop means. With prolonged use of the stand, the stop block can damage the motorcycle frame. Moreover, once it is mounted, it must be almost entirely dismounted should one desire to replace the U-shaped rod if the latter becomes bent. Therefore, to avoid the possibility of any bending of such rod, great care must be exercised in heat treating the rod after its fabrication.

Another problem with the prior patented stand is that most of the parts have to be brought together in an assembly, albeit a loose one, at the time the stand is mounted on the motorcycle. While this is not a major problem, it would be desirable to enable the mechanic mounting the stand on the motorcycle to attach the mounting plates first and then assemble the remaining parts with reference to the mounted plates.

SUMMARY OF THE INVENTION

The present invention obviates all of the problems inherent in prior art stands in that, for example, when mounted the stand does not strike the frame or other parts of the motorcycle. Moreover, it may be mounted by attaching the bracket plates first and separately to the frame and then putting together the several components which, when assembled constitute the U-shaped legged rod. These components may be disassembled at any time without having to remove the bracket plates from the motorcycle frame.

Lastly, when assembled the stand moves from extended position to retracted position (and vice versa) where it held by stop means of which the motorcycle frame forms no part.

These desirable results are accomplished by providing a dismantleable U-shaped rod which may be assembled and disassembled in reference to the bracket plates while the latter are secured to the motorcycle frame. At least one bracket plate is arcuately orificed with its radius of curvature pivoting about a point lying on the axis of the horizontal portion of the assembled U-shaped rod. Inserted into this arcuate orifice is a horizontally extending stop member which is secured in such horizontal disposition by an element attached to the horizontal portion of one of the L-shaped elements which when assembled make up the U-shaped rod. A tension spring extending between a lateral projection from at least one of the bracket plates and the vertical portion of one of the L-shaped elements serves to snap the U-shaped member into either retracted or extended position, depending upon at which side of the center of the swing movement the U-shaped member is disposed.

The stand may be rapidly and easily assembled and repaired. It provides its own stop means without having to employ any part of the motorcycle frame. When mounted, the operator may readily elevate the front wheel of the motorcycle by pushing down one leg of the stand with his foot and backing the motorcycle up on to both legs of the stand. When the operator desires to move the machine off the stand, he simply applies power to the rear wheel and the motorcycle moves over the stand which then snaps back into its retracted position.

BRIEF DESCRIPTION OF THE DRAWINGS

In the drawings,

FIG. 3 is an enlarged side elevation of the left side of the stand shown in FIG. 1.

FIG. 4 is a further enlargement of a portion of the stand shown in FIG. 3.

FIG. 5 is a partial elevation of the cross-bar of the U-shaped rod.

DESCRIPTION OF THE PREFERRED EMBODIMENT

Figure 1:
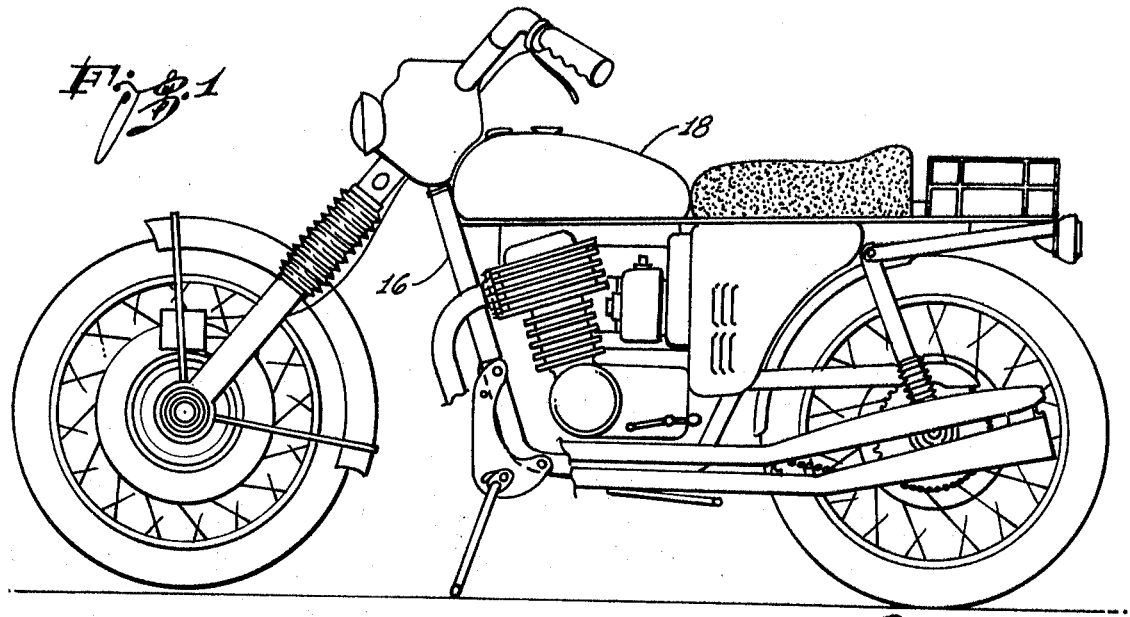
FIG. 1 is a side elevation of a motorcycle illustrating the manner in which the stand of the present invention is attached and appears when machine is moved back onto the stand.

The stand of the present invention is constructed of a pair of bracket plates 10, 10a, each of which is provides with several holes 12 through which screws 14 may be passed to attach the plates, one on each side of the frame 16 of the motorcycle 18.

Figure 2:
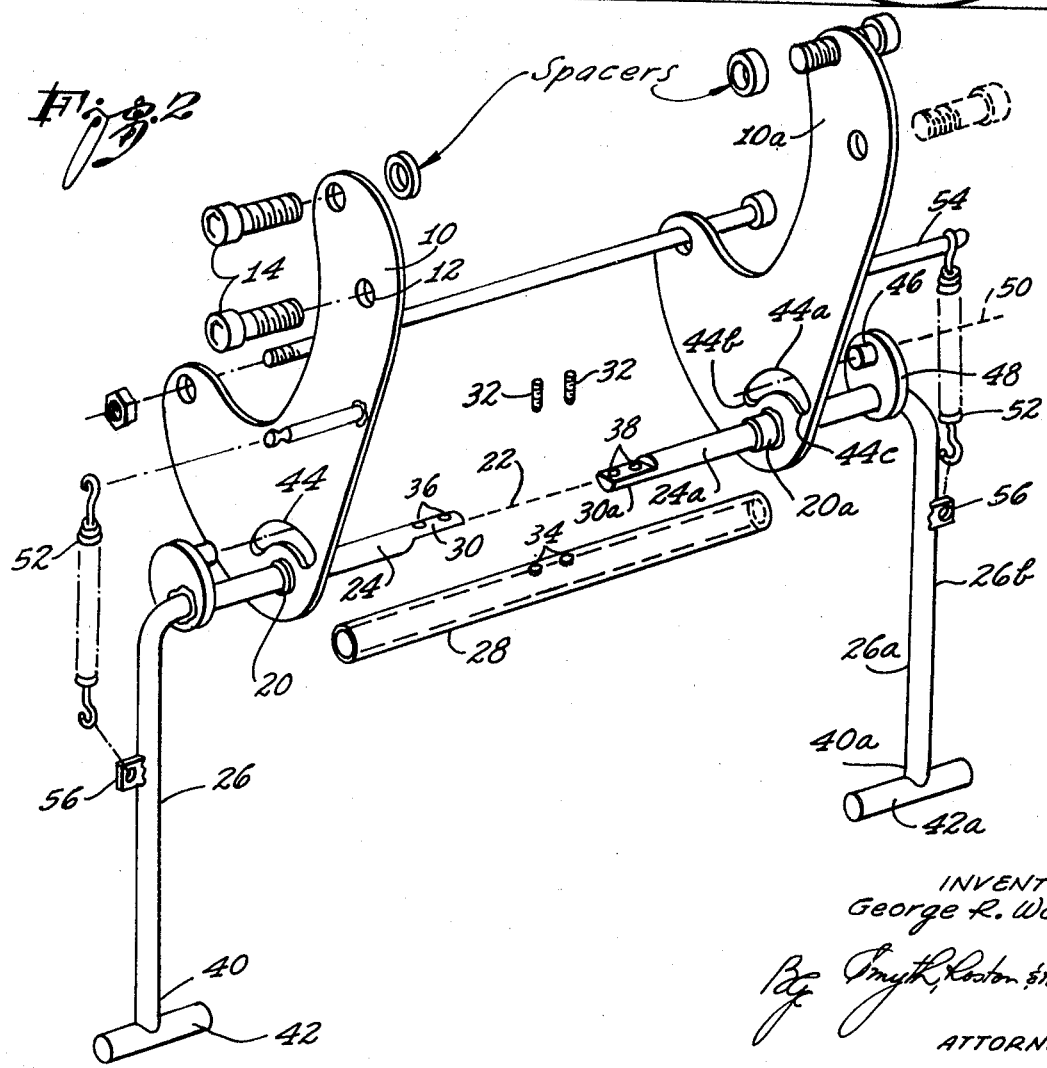
FIG. 2 is an exploded view of the stand assembly.

When properly attached the plates 10, 10a will be disposed relative to each other as shown in FIG. 2. In this disposition, the bushings 20, 20a of the plates will be lined up on a common axis 22 to receive coaxially the horizontal legs 24, 24a, of the L-shaped members 26, 26a, respectively. Upon insertion through the bushings 20, 20a, the legs 24, 24a are further inserted in one end of the tubular element 28 and pushed in until their ends 30, 30a overlap. Screws 32, 32a are then threaded through the registering holes 34, 36 and 38 in the tubular element 28 and the ends 30, 30a of the legs 24, 24a, respectively, thereby forming a U-shaped rod assembly.

The other extremities 40, 40a of the members 26, 26a, respectively, may be provided with horizontal feet 42, 42a in order to provide a greater distribution of the weight of the motorcycle when it is elevated on the stand. These feet 42, 42a also minimize scarring of the surface upon which the motorcycle is supported by the stand.

At least one of the plates 10, 10a must be provided with stop means. In FIG. 2, however, both plates are shown to be so provided. While this is desirable to reduce the strain on one stop means, it is not necessary to make the stand operative. Only the stop for the left side of the motorcycle means will be described, but it is understood that if another is provided for the right side, it will be similarly constructed.

The stop means includes an arcuate slot 44 having its radius of curvature originating at the axis 28 through the bushings 20, 20a, and an element 46, one end of which extends horizontally into the slot 44a. This element is rigidly supported on the horizontal leg 24a of the L-shaped member 26a, by a disc 48, as by welding. The distance between the axis 50 of the element 46 and the axis 28 equal to the radius of curvature of the arcuate slot 44a so that the element 46 may move in the arc of the slot with the rotation of the leg 24a, limited, however, by the slot extremities 44b and 44c.

In order that the U-shaped assembly (26, 26a and 28) may be snapped into either its retracted or extended position and effectively held there, a tension spring 52 is provided to extend between a projection 54, secured to the outside of the plate 10a, and an orificed ear 56 attached to the vertical leg 26b of the L-shaped member 26a. This spring 52 is centered so that its greatest tension occurs when the legs 26a, 26b are half-way in their swing between the extended position E and their retracted position R, as shown in FIG. 3.

From the foregoing description it may be seen that the stand of the present invention may be sold as a kit and easily attached to a motorcycle. After the plates 10, 10a are attached, the L-shaped member 26, 26a are inserted through the backings 20, 20a and into the tube 28 where their ends are secured together by the screws 34. The spring or springs 52 are attached and the stand is ready for use. It may be pushed down by the operator's foot until it touches the ground, whereupon by backing the motorcycle, the front end will rise up onto the stand and be supported by the latter. When it is desired to drop the motorcycle down from the stand, the operator simply applies power to the rear wheel and rides forward. As the stand passes the center of its swinging arc, it snaps into retracted position without being touched by the operator.

I claim:

1. A retractable stand for mounting on a motorcycle to support the same upright with it front wheel spaced above ground level, comprising:
   A. a stand member in the form of a rod of the configuration of an inverted letter U with two legs extending from a cross-bar to swing downwardly and forwardly from a first upper rearward retracted position to a second lower forwardly inclined effective position for supporting the motorcycle;
   B. a pair of bracket plates for mounting on the motorcycle on the forward part of the frame of the motorcycle, said plates being spaced apart from each other and having corresponding coaxial bushings journaling said stand member, and each of said plates being provided with a plurality of spaced apertures to receive screw means for fixedly anchoring the plate to the motorcycle; at least one of said plates having a laterally extending projection; and at least one of said plates having an arcuate slot spaced from its bushing, the radius of curvature of the arc of said slot radiating from the axis of the bushing;
   C. stop means to limit the swinging movement of the stand member between said two positions, said stop means comprising an element parallel to and spaced from the axis of the bushings, said element having a first end disposed horizontally to extend through the arcuate slot in said plate for movement therein; and means securing the second end of said element to the cross-bar of the U-shaped stand member to maintain said disposition of the first end in said arcuate slot; and
   D. a tension spring connected at one end to said projection and at the other end to one of said legs, the points of connection of the spring with the projection and leg being positioned for the spring to swing past center as the stand member swings between said two positions, whereby the spring yieldingly holds the stand member at either of said two positions.

2. The stand as described in claim 1 wherein the U-shaped member is constructed of a straight tubular section disposed between the bracket plates and two L-shaped leg sections, one leg of each of the latter sections being inserted through a bushing in one of the bracket plates and into one end of the tubular section, and removable means are provided to secure said inserted legs against withdrawal from the tubular section.

* * * * *